INVENTOR.
John R. MacKay
BY
Cooper, Kerr & Dunham
ATTORNEYS

Patented July 18, 1944

2,354,086

UNITED STATES PATENT OFFICE 2,354,086

RADIOMETEOROGRAPH RECEIVING RELAY APPARATUS

John R. MacKay, West Caldwell, N. J., assignor to Wallace & Tiernan Products, Inc., Belleville, N. J., a corporation of New Jersey Application September 30, 1941, Serial No. 413,051

23 Claims. (Cl. 250—2)

An increasingly important form of automatic radio signalling is in radio-meteorograph apparatus, comprising, for example, a radio transmitter automatically controlled by meteorological instruments to emit signals representing conditions such as pressure, temperature and humidity, together with radio receiving apparatus having a suitable recording instrument for response to the signals. The transmitter and its controlling devices may be carried, for instance, by a balloon and arranged to operate with appropriate continuity or periodicity so that a desirably continuous record of the noted conditions and their changes is produced on the chart at the receiving station. To control the recording apparatus from the receiver, electromagnetic relays have been used; but certain difficulties and disadvantages have been found in this and other aspects of the system.

Ordinarily the transmitted signals consist of timed impulses, such as discrete carrier impulses or interruptions in a continuously transmitted carrier, or the like, and the recorder being synchronized with the remote, e. g. balloon-carried transmitter, it is important that the dots or pen-strokes of the recorder correspond promptly and accurately to the signal impulses and to them alone. Relays with a mechanically delayed action might seem useful in the receiver output for discriminating the signal impulses (which are of a sustained although extremely brief nature) from static or other stray or transient effects that might be picked up. However, these devices usually involve some inertia or friction and are apt to be insensitive or unreliable in their response. Furthermore, even though designed otherwise, they generally involve at least some delay in the return stroke, which is a disadvantage in radiometeorograph systems.

For example, particularly where the balloon is rising or traveling rapidly, it is often desirable to have the successive readings of temperature, pressure and humidity follow each other as quickly as possible, to obtain a more continuous meteorological report. The value of each impulse-reading is determined by its position in time and where, for instance, successive time-ranges correspond to different meteorological conditions, the ranges should be very short and with very little interval between them. But for such purposes, a delayed-response relay of the available type mentioned is apt to be insufficiently uniform (in its time of delay) for desired accuracy, and is likely to fail of discrimination between very rapidly succeeding impulses, as may occur at the adjacent ends of two time ranges, or in systems using a multiple-impulse signal.

The present invention has for a chief object to provide new and improved relay apparatus and procedure, as for use in systems of the sort described, and especially to provide relay arrangements which are extremely accurate and reliable, free of inertia, friction and other mechanical losses, highly sensitive and indeed adapted to respond with practically no flow of current in the controlling circuit, and which at the same time afford a time delay that satisfactorily rejects stray or other unwanted signals and permits remarkable rapidity of operation, i. e. with a minimum time interval between successive signal impulses.

A further object is to provide improved radiometerograph apparatus, which is more reliable, sensitive and rapid in operation, and which is substantially unaffected by static or other unwanted signals or pulses, and wherein the operation of the recording or other translating instrument is satisfactorily independent of large variations in the strength of the controlling signals as received.

Other objects are to provide improvements in electronic and electrical time-delay relay apparatus, and in sub-combinations and elements thereof, affording one or more improved characteristics, such as high sensitivity, rapidity of response, independence of response from variations in signal strength, virtual freedom from inertia and other losses in its delay characteristics, and accurate control of the time delay feature by means continuously variable over a wide range, and at the same time affording, if desired, means for extremely rapid response to successive signals. A particularly important object of the invention is to provide sensitive relay apparatus including a time delay characteristic in one direction and having no appreciable delay or lag in its operation in the other direction.

To these and other ends, including such as are hereinafter apparent or are incidental to the features and combinations disclosed, the invention may be conveniently explained in connection with certain presently preferred embodiments of the apparatus thereof, set forth by way of example and illustrated in the annexed drawings, wherein.

Figure 1:
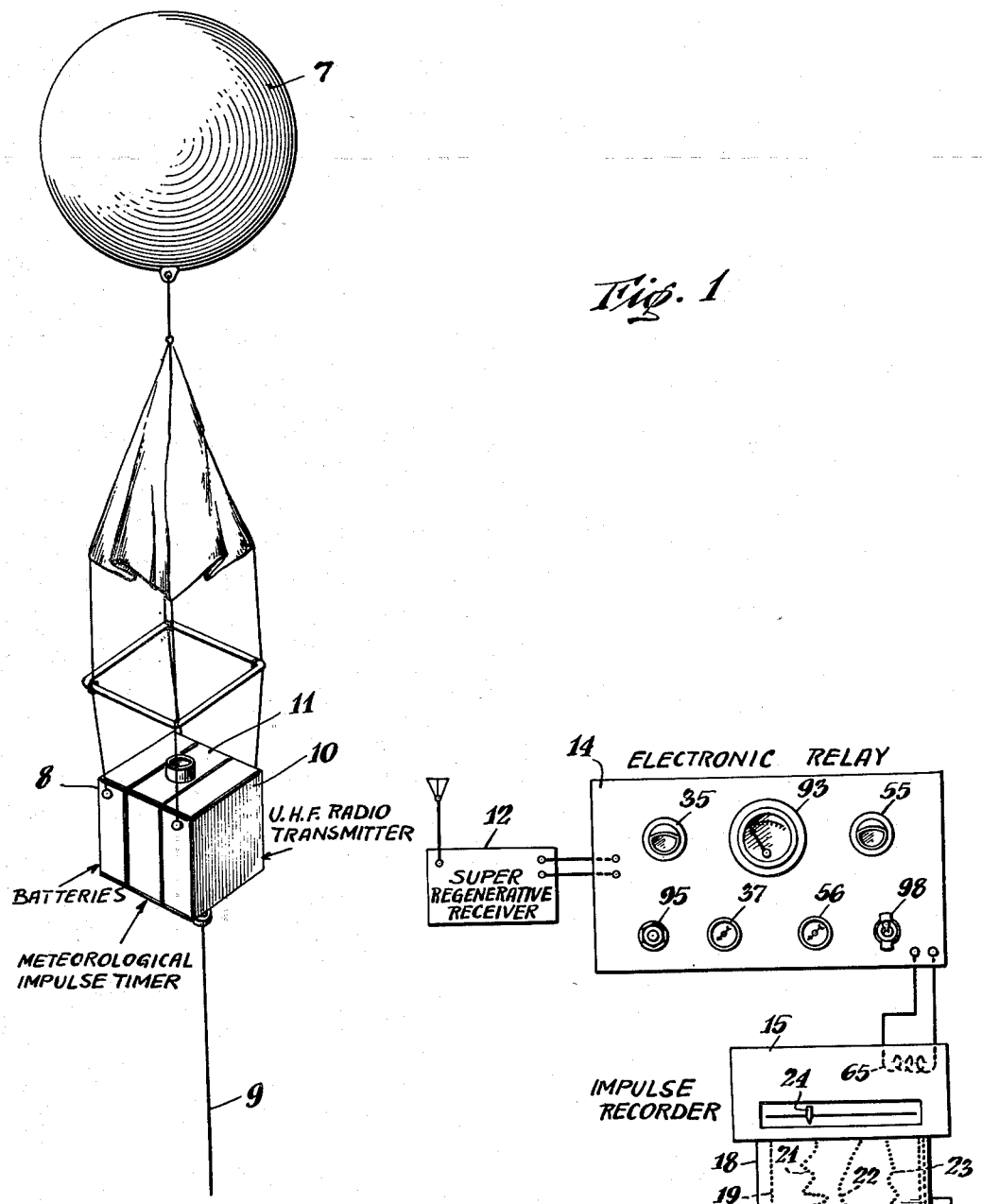
Figure 1 is a schematic, generalized view of radiometeorograph apparatus embodying the invention.

Although important combinations and features of the present invention can be advantageously embodied with other apparatus, the invention may be conveniently exemplified in a radio-meteorograph system of a presently satisfactory specific sort which is illustrated in Fig. 1, wherein the transmitting portion of the system, carried by the balloon 7, includes the battery box 8 (for power supply), the antenna 9, a radio transmitter 10 and a meteorological impulse timer 11 which includes the meteorologically sensitive elements and the associated telemetering means (not shown). The observing station on the ground includes a radio receiving apparatus 12, for example of the super-regenerative type, which has some advantages for reception of waves at the so-called ultra-high radio frequencies. Ordinarily, at present, the ultra-high frequencies, such as from 100 to 300 megacycles, are suitably available, and therefore used, for radio-meteorograph signal transmission. The receiver 12 controls relay structure embodying the present invention and generally designated by the box or panel 14, and the relay controls a desired translating means, such as the impulse recorder 15. Detail features in the transmitting and other instrumentalities at the balloon and likewise in the receiver and recorder are not specific parts of the invention and are thus omitted for clarity of illustration; but certain valuable improvements in various aspects of the system, with which my present invention is particularly adapted to cooperate, are described and claimed in the copending applications of Charles F. Wallace, Serial Nos. 327,767 (filed April 4, 1940) and 317,618 (filed December 26, 1940). The receiver, moreover, may conveniently embody a super-regenerative circuit using the "rush current" feature for control purposes, as disclosed and claimed in my Patent No. 2,165,062, issued July 4, 1939, for Communicating system.

A presently preferred form of radiometeorograph apparatus (embodying features of the aforesaid Wallace applications) may include an impulse timer at the balloon (run by a small motor or clockwork), which causes transmission of successive cycles of impulses, each cycle comprising a timing or index impulse, and one or more impulses thereafter related in time to the index impulse by an extent corresponding to the reading of the meteorological instruments. Such structure may comprise barometric, temperature, and humidity sensitive elements, each adapted to adjust its corresponding cam contacts, whereby the position of the latter is translated into timing of the impulse effected by the contacts in the transmitted signals—for instance, the signals emitted by the illustrated transmitter 10.

The apparatus may further include, under control of the receiver, an impulse recorder having a control relay and a traveling arm with an electromagnetically stroked pen, so arranged that when an index impulse is received the pen arm makes a dot on the chart and starts to travel across the chart. As successive impulses are detected, corresponding to pressure, temperature and humidity, the pen makes corresponding dots on the chart; and at the end of its travel, the pen arm returns very rapidly to its original or starting position, the chart is advanced a small distance and the apparatus awaits transmission of the next cycle. If desired, the cycle may also include a motor speed checking index impulse conveniently a double impulse, to distinguish it), which the operator at the receiver may use for synchronism, i. e. to adjust the speed of pen arm travel so that the corresponding index dots at the far end of the chart go to make up a straight vertical line (or double line, as shown). Consequently, the chart record, such as that shown at 18 from the recorder 15 in Fig. 1, may include the index lines 19, 20, and intermediate lines or curves 21, 22, 23 (all made of dots produced by the pen arm 24), representing the several changing conditions detected at the balloon.

A useful practice is to have the signal impulses actually consist of brief interruptions in an otherwise continuous wave or signal emitted by the transmitter, whereby the substantially continuous signal may be used to detect and follow the position of the balloon, as with a directional receiving antenna or supplemental directional receiver (not shown) In the output of a super-regenerative receiver, such interruptions of an otherwise continuous wave are represented as impulses of the so-called "rush" current (which is depressed by a received carrier). It may therefore be assumed that the relay structure 14, shown in detail in Fig. 2, is controlled by such rush current impulses or signals from the receiver 12 (in accordance with my aforesaid Patent No. 2,165,062); but it will be understood that relay device is equally adapted for response to direct signal impulses in other kinds of radio receivers or may be arranged for control by other types of signal arrangements such as explained elsewhere below.

Figure 2:
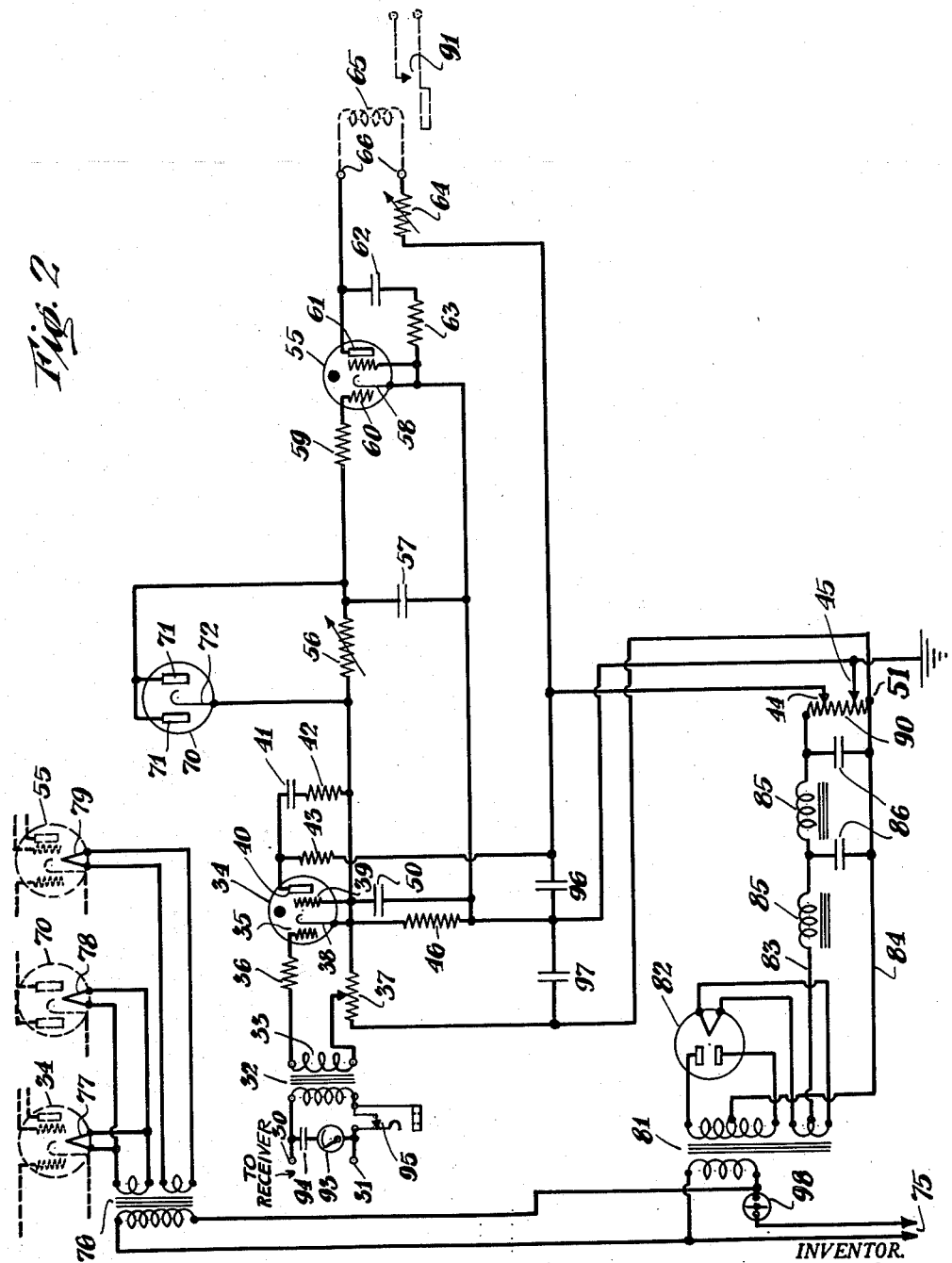
Fig. 2 is a wiring diagram of an advantageous form of the improved relay apparatus.

Referring now to the relay apparatus as shown in Fig. 2, the input circuit, although in some cases susceptible of direct coupling as across the load resistor of a diode detector, in other types of receivers (e. g. to handle discrete radio signal impulses, either modulated or unmodulated), includes a coupling transformer 32 such as of the audio frequency interstage type, having it primary connected to the output terminals 30, 31 of the super-regenerative receiver. The secondary 33 of the transformer is connected in the control grid circuit of an electronic device which is preferably of the grid-controlled ionic discharge type—i. e. a device of the sort sometimes called a grid-glow tube. Although in some cases other devices may be used (such as a tube of the cold cathode type) I at present prefer to use a tube having a heated cathode or filament, such as the hot-cathode gas tetrodes known as RCA 2050 and 2051. Chiefly by way of example, all the circuits herein shown may be taken as embodying gas-filled tubes of the "2050" type (which has a very low tube voltage drop on breakdown), and for purposes of illustration, specific values of the various circuit components are given as for such tubes; but it will be fully apparent to those skilled in the art that changes in the values or arrangement of the various circuits may be readily made, as and if necessary, for other types of tubes, as well as for other uses and adaptations of the apparatus.

The grid-glow tube 34, which is preferably of the type having a steep control characteristic and requiring practically no grid current (such as RCA 2050) has its control grid 35 connected through a high resistance 36 (say, 5 megohms) which prevents appreciable grid current and which is preferably connected close to the socket terminal to minimize pickup, to the secondary 33 of the transformer 32, the other side of the transformer being connected through a biasing potentiometer 37 to the cathode 38 of the tube. The tube includes a shield grid 39, advantageously connected to the cathode, and a plate or anode 40, to which is connected a condenser 41 having its other side connected to the cathode 38, preferably through a low resistance 42. Means are provided for applying a charging voltage to the condenser, and include a relatively high resistance 43 connected to the anode side of the condenser and extending to the positive terminal 44 of a suitable voltage source. The effective negative terminal 45 of the plate voltage source is connected to the cathode 38 through a dropping resistor 46 (hereinafter explained).

The voltage between the terminals 44 and 45, for example about ninety volts, is thus applied to the condenser 41, and charges it to that potential, it being assumed that no signal is received, and that the grid circuit of the tube is biased sufficiently in a negative direction to prevent the tube from firing. Now if a signal is received, or if the incoming carrier in the super-regenerative receiver disappears and the "rush" current reappears across the primary of the transformer 32 (the rush current being conveniently considered as a "received" signal), each alternate half cycle of the consequent alternating electromotive force in the secondary 33 sufficiently reduces the negative grid bias to a point where the tube will discharge, i. e. become conductive between its anode and cathode, under the voltage applied to the anode by the condenser 41, automatically charged in readiness. The condenser thus immediately discharges through the tube, the resistor 42 serving to limit the value of the discharge current so as to prevent damage to the cathode. When the tube thus fires, the voltage drop or resistance between the anode 40 and the cathode 38 becomes extremely low (say of the order of a few volts) and because of the high value of the resistance 43 (say 10,000 ohms), as well as of the further resistance 46 in the "B" voltage supply circuit, the anode voltage is at once dropped below ionizing potential, causing self-interruption, i. e. extinguishment, of the discharge.

Thereupon condenser 41 is automatically recharged, and if the grid 35 is still or again at firing potential, the tube again fires and again, in the same way, provides self-extinguishment and interruption of anode current. It will be seen that the anode connections thus provide an oscillating circuit of the relaxation type, but which is controlled by the grid 35. So long as the controlling signal voltage is applied to the grid (keeping it at or above the control point, e. g. at no greater negative potential in tubes— such as those specifically mentioned above— where the control point is negative), the described pulsations or oscillations will take place in the plate circuit, i. e. successive firing of the tube and reduction of the anode voltage. When the signal impulse ends, the tube becomes and remains extinguished, because after the last condenser discharge induced by the signal (and consequent interruption of firing) the removal of the signal restores the grid bias to cut-off, e. g. to a point more negative than, or otherwise below the control point. Thus a very desirable arrangement is afforded whereby the end of the signal extinguishes the tube; it being understood that otherwise, i. e. with a sufficient D. C. anode voltage and no periodic or other reduction in such anode voltage, tubes of this type (e. g., thyratrons) continue to fire when once triggered off, even though the grid voltage is subsequently reduced below cut-off.

At the same time, i. e. during the existence of a signal, there is a substantially continuous current flow through the resistor 46, alternately consisting, first, of the current pulse which is drawn from the supply 44—45 when the tube is conductive, and then, of the current pulse flowing to charge the condenser 41. As a result, a substantially constant voltage, always the same, is developed across the resistor 46, which may be appropriately smoothed by the condenser 50 (say, 5 mfd.), and is utilized for control purposes as now to be explained. It will also be seen that the voltage thus developed in response to and of the same duration as the signal, is entirely independent of the value of the signal voltage, provided that the latter exceeds the minimum necessary to cause the tube to fire.

The potentiometer 37, which provides an adjustable bias (e. g. negative or otherwise below the control point, to the extent desired) in the grid circuit to prevent operation except when a signal is applied, is connected in series with the resistor 46 across the terminals 45, 51 of a suitable voltage source (say 22½ volts); the resulting small current produces a suitable voltage drop in the potentiometer resistance, and also in the resistor 46 for bias purposes on the succeeding relay tube as hereinafter explained. Since the difference between the actual bias on the tube 34 (from the potentiometer) and the control or firing point determines the strength of signal needed for operation, the potentiometer provides an effective sensitivity adjustment, also useful in reducing interference.

The resistance in the anode voltage supply circuit, the limiting resistance 42, and the condenser 41 are preferably of such values, in correlation, as to provide a reasonably high frequency of interruption, say 200 to 400 interruptions per second. In this manner, the response of the tube is extremely prompt, both to the application of a signal and to its cessation. One set of values suitable for such purpose is: 0.5 mfd. for condenser 41, 50 ohms for the limiting resistor 42, 10,000 ohms for resistor 43, and 2,000 ohms for resistor 46. The total resistance of the potentiometer 37 may be, for example, 4,000 ohms.

The voltage developed across the resistor 46 when tube 34 fires, is applied through a time delay circuit to the input of a second and conveniently identical tube 55, for ultimate control of the meteorograph recorder or other translating device. The time delay circuit conveniently consists of a variable high resistance 56 connected in series with a condenser 57 across the resistor 46; the condenser being connected at one side to the cathode 58 of the tube 55 and at the other side through the high resistance 59 (corresponding to the resistor 36) to the control grid 60 of the tube 55. For time delay in radio-meteorograph apparatus of the sort I have described, convenient values for condenser 57 and variable resistor 56 are respectively 0.2 mfd. and 0–1 megohm.

It will now be observed that when no signal is received and tube 34 is not firing, an appropriate negative bias, sufficient for cutoff, is applied to the grid 60 by the resistor 46, which has a voltage drop in the circuit of potentiometer 37; i. e., the condenser 57 is thus kept charged with its cathode side positive. However, when a signal is received and fires the tube 34, current flows in the opposite direction in the anode circuit of the resistor 46, thus reducing or overcoming its normal biasing drop. The effect is that current flows through the resistor 56 in a direction to charge positively, i. e. to add positive charge to, that side of the condenser 57 which is connected to the grid 60; and when a potential is there reached which is above (e. g., at least less negative than) cut-off potential, the tube 55 fires. The flow of electricity for thus changing the charge of, or adding charge to, the condenser 57 is impeded by the resistance 56, and the time consequently taken for the operation affords the desired delay, in triggering the tube 55 and hence in the ultimate response of the recorder. The time of delay may be accurately varied and set, by simple adjustment of the variable resistor 56.

The anode 61 of the tube 55 is connected through a self-interrupting circuit of the relaxation type, similarly to that for the anode of tube 34. Such circuit comprises a condenser 62 and a limiting resistor 63 (corresponding to condenser 41 and resistor 42), and a plate impedance, corresponding to the resistor 43, and consisting of the resistor 64 and the winding 65 of a recorder relay or like translating device connected to the output terminals 66 of the electronic unit proper. Preferably the constants of this circuit are also chosen to provide a fairly high frequency of interruption, say 200 to 400 cycles or higher, for like promptness of response. In selecting these constants, account should be taken of the impedance of the device, such as relay winding 65, which must be operated from the terminals 66; just as in the case in the tube 34 the constants of the output circuit are selected to provide appropriate voltage drop across the resistor 46. Thus, for example, where a relay winding 65 having an impedance of approximately 1280 ohms was used, satisfactory results, at the desired high frequency of interruption, were had with these values: condenser 62, 2 mfd.; resistor 63, 15 ohms; and resistor 64 set at approximately 2,000 ohms. For some flexibility in matching various impedances in devices to be controlled, the resistor 64 may be of the variable type, having a total value of, say, 4,000 ohms.

Although it is desirable to have a time delay between the application of a signal to the input circuit and the ultimate response of the relay, it is frequently very desirable to avoid any such delay when the signal impulse ends. As previously explained, the time between the end of one impulse and the beginning of another (for example between the end of a temperature reading and the beginning of a pressure reading) may sometimes be very small, say of the odder of a fraction of a second. Accordingly the relay system should, as soon as the first impluse is over, be ready for response, with appropriate stray-rejecting delay, to the next signal. Ordinarily, in the circuit shown, when the voltage due to operation of the tube 34 disappears across the resistor 46, some time would be involved in the discharge of condenser 57 through resistor 56, leaving the tube 55 in firing condition for a corresponding appreciable time.

Accordingly, I provide means for substantially instantaneous discharge of condenser 57 when the described charging voltage is removed, and have found that a preferred device to that end is a rectifier, such as the vacuum tube rectifier or valve 70 which is connected across the resistor 56 in such way as to provide a very low resistance path for such discharge of the condenser 57; and at the same time the rectifier has an extremely high resistance, indeed relatively infinite so as not to reduce the delay effect of resistor 56, to current in the opposite direction. Although various such devices may be used, a full wave rectifier tube, such as the type known as RCA 84, may be employed, having its plates 71 connected together in a half wave circuit so that side of the condenser 57 which extends to the grid of the tube 55, and its cathode 72 connected to the other end of the variable resistor 56.

With this arrangement, delay is interposed between the response of the tube 34 to an incoming signal, and the desired change of voltage in the grid circuit of tube 55 for control of the relay 65 or other translating device; and the delay is determined by the time constant of the combination of resistance 56 and capacity 57. On the other hand, upon interruption of a signal, the condenser 57 discharges practically instantaneously through the rectifier tube 70, so that there is no delay in the restoration of the tube 55 to its non-firing condition. It will be noted that for simplicity of explanation, the operation of the unidirectional delay system has been generically—and indeed quite properly—described as involving the appearance or disappearance, across the resistor 46, of a voltage for charging the condenser 57; the electrical effects being the same as, and the terminology inclusive of, an arrangement where (as in the illustrated circuit) there need only be changes of the value, rather than the polarity, of voltage across the resistor, and corresponding changes in the charge of condenser 57 to bring its grid-connected side respectively above and below the predetermined control potential (usually a negative point) for the tube 55.

Although batteries may be used for energy supply to the heaters of the several tubes, and likewise for the anode and the grid voltages, the illustrated apparatus of Fig. 2 conveniently includes means for current and voltage supply from the usual 110 volt A. C. line 75. This means may include a step-down transformer 76, and although all heaters may be energized from a common secondary of the transformer, I have shown a presently preferred arrangement of two 6 volt secondaries, of which one energizes the heaters 77, 78 of the tubes 34, 70 (in parallel) and the other is connected to the heater 79 of the tube 55. For convenience of illustration, the heater circuit is shown separately in Fig. 2, it being understood that the tubes shown in dotted lines are the identical tubes elsewhere shown in full lines in this figure.

The energy supply means also includes a suitable transformer, rectifier and filter for supplying the appropriate voltages between the terminals 44, 45 and 51. For example, a power transformer 81 has a center-tapped secondary which is connected, as shown, through a full wave rectifier tube 82 (such as RCA 80) to provide rectified E. M. F. across the lines 83, 84; line 83 having the usual return connection to a center tap of the additional secondary which energizes the filament of the rectifier 82. A choke-input filter, preferable for voltage stability and including a pair of chokes 85 (e. g. of 200 ohm, 30 henry, value) and smoothing condensers 86 (say, of the electrolytic type, 8 mfd. each), is connected in the supply line and extends to a bleeding and voltage dividing resistor 90 (between the terminal 51 and the positive line), having for example a total resistance of 5,000 ohms.

Although other control or translating instrumentalities may be connected in or otherwise controlled by the output of the circuit in Fig. 2, I have shown, for convenience of illustration, the relay winding 65, which may advantageously be the recorder relay itself (that directly controls the pen drive and printing operations) or may, if desired, operate intermediate control means such as the contacts 91. For accuracy of control and adjustment, a sensitive alternating current voltmeter 93 may be connected, conveniently in series with a condenser 94 of say 0.1 mfd. capacity, across the primary of transformer 32. The strength of the signal (here constituting the un-suppressed rush current from the super-regenerative receiver) may be determined from this voltmeter, which may have a range, for example, of 0 to 15 volts. A normally closed jack 95 may also be included in the primary circuit of the transformer, so that headphones may be here connected for tuning or other checking purposes. Conveniently, by-pass condensers 96, 97, e. g. of about 1 mfd. each, are connected across the anode and grid bias voltage supplies as shown.

It will now be seen that the illustrated arrangement provides an extremely sensitive, accurate and reliable relay arrangement, including an exact but readily adjustable time delay, preferably operative in one direction only. Assuming that the remote meteorograph transmitter sends one of its dot-impulses, or dot-interruptions in an otherwise continuous carrier, the result (depending on the type of receiver used) is to apply a signal to the input of the transformer 32. This signal (preferably of a high audio frequency) in the secondary 33 of the transformer, raises the grid voltage on the tube 34, i. e. makes it less negative so as to get above the cut-off point, at least during alternate half cycles of the signal. As a result, the tube fires at once, being poised to do so by reason of the charged condition of condenser 41.

Thereupon so long as the signal continues, the tube continues to fire, with rapidly periodic, momentary self-interruptions. A voltage is developed across the resistor 46, and after the desired time delay (in charging the condenser 57 through the resistor 56), the voltage on the grid of the tube 55 rises above the cut-off point, and tube 55 similarly fires, producing current flow through the relay winding 65 and operating the contacts 91 to cause the pen 24 (Fig. 1) to make a dot or other mark on the recorder chart 18. In this way, static or other strays or transients, which do not have the duration of the signal impulse impressed on the transformer 32—the signal being really very brief but much longer than the usual static or stray impulses—cannot affect the control grid of the second tube 55, since they do not keep the tube 34 in operation sufficiently long to charge condenser 57 up to breakdown voltage for the tube 55.

Upon interruption of the signal impulse, tube 34 stops firing at once, the voltage across resistor 46 is immediately restored to its normal condition of cut-off value and polarity, and condenser 57 immediately discharges (through the rectifier), thus likewise immediately cutting off the tube 55. The system is thus immediately restored to condition for desirably delayed response to a succeeding impulse, and it will now be seen that the speed of operation of the system is limited only by the adjustment of the resistor 56, as may be necessary for desired avoidance of interference. For example, to make a dot on a translating device such as the recorder 15, each signal impulse need last only slightly longer than the time delay imposed in the circuit. Likewise, full response will be had to successive impulses, affording discrete strokes or notations on the chart, even though their actual separation in time, i. e. between the end of the first impulse and the beginning of the second, is extremely short and indeed even much less than the time of delay.

Accordingly, the apparatus is admirably adapted for high speed meteorograph work, as with apparatus of the type described in the above mentioned Wallace applications, wherein the recorder may be operated at speeds as high as 8 sweeps per minute, which means that the pen arm fully traverses the chart in about 7½ seconds (with a return stroke of ½ second) and that 8 complete sets of meteorographic readings and recordings are made per minute.

By way of illustration, the apparatus 14 of Fig. 1 comprises that shown in Fig. 2, mounted in a suitable case. Conveniently the tubes 35, 55 may be disposed horizontally so that their upper ends are seen through the panel, thereby affording a visible check, from the glow of each tube when it fires, that the apparatus is functioning properly. The voltmeter 93 may also be mounted on the panel, and likewise the knobs for control of the sensitivity (grid bias resistor 37) and the delay (resistor 56). The phone jack 95 and an on-off snap switch 98 (in the A. C. supply line, Fig. 2) are also mounted on the panel.

Figure 3:
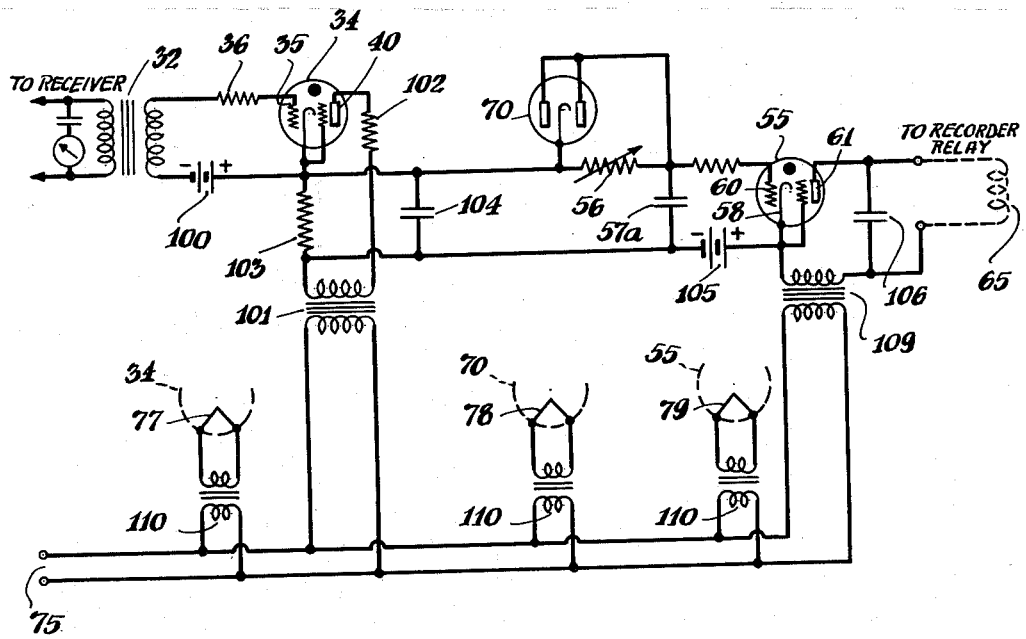
Fig. 3 is a wiring diagram of a modified form of the apparatus of Fig. 2.

Fig. 3 shows a modified and in some respects simpler embodiment of certain features of the invention, which is adapted for direct energization from an alternating current power line. However, especially where such line is of the usual low, 60 cycle type, the apparatus is not adapted for as rapid and accurate operation as that of Fig. 2. In Fig. 3, similar parts are identified by the same reference numbers, and it will be seen that the signal input, from the receiver, is applied, as before, through the transformer 32 and high resistance 36 to the grid 35 of the grid-controlled discharge tube 34. The grid 35 is maintained below cut-off, i. e. at sufficient negative potential, by means of the grid bias battery 100.

The anode of the tube 34 is supplied directly from the secondary of a power transformer 101, which may conveniently be of substantially 1–1 ratio, for a tube of the type mentioned above, and when connected to a conventional 110-volt line. A limiting resistor 102 (e. g., 5,000 ohms) is connected intermediate the transformer secondary and the anode 40, and an output dropping resistor 103, for example 1,000 ohms, is connected intermediate the other side of the secondary and the cathode 38. A smoothing condenser 104 (say, 10 mfd. or other appropriately large capacity) is connected across the resistor 103, and the latter is further connected to the time delay circuit of resistor 56 and condenser 57a (which in this particular circuit may be of slightly smaller capacity, say 0.1 mfd.). For prevention of delay on the "return stroke," the rectifier tube 70 is connected as in Fig. 2. The terminals of condenser 57a are connected in the grid circuit of the second tube 55, also as in Fig. 2, except that a suitable biasing battery 105 is included to keep the grid 60 normally below cut-off except when a signal is received—there being no bias voltage across the resistor 103 when the tube 34 is inoperative.

The anode 61 of the tube 55 may be connected through the recorder relay 65, shunted by a suitable by-pass condenser 106 (e. g. 2 mfd.), to the secondary of a power transformer 109, which may be identical with the transformer 101 and which may have the other side of its secondary directly returned to the cathode 58. The heaters 77, 78, 79 of the tubes 34, 70, 55 may be respectively energized from the secondaries of suitable 6-volt heater transformers 110, for example as shown.

In the arrangement of Fig. 3, it will now be seen that an incoming signal, applied through the transformer 32, raises the voltage on the control grid 35 above cut-off and causes the tube to fire. The anode is supplied with alternating current, and consequently the tube only fires during that half cycle (of the A. C. supply) which is positive with respect to the anode, and only during so much of that half cycle (usually a substantial part) as imposes a positive voltage on the anode of sufficient value for breakdown with the grid voltage at the value determined by the signal and the biasing battery 100. On the alternate half cycles of supply from transformer 101, the anode 40 is negative, and the ionic discharge is extinguished—to be re-established on the next half cycle if the signal is still impressed on the grid 35, i. e. if the grid is still above the control point. Thus a pulsating unidirectional current flows in the resistor 103 and as smoothed by the condenser 104, is applied through the time delay circuit to the grid of tube 55. The anode circuit of this tube functions in the same manner as that of tube 34, and so long as the applied signal continues to maintain the grid 60 above cut-off, current flows through the relay winding 65.

It will now be seen that in many respects, particularly regarding the unidirectional time delay arrangement and the independence (in response) from variations in signal strength, the apparatus is similar to Fig. 2. However, with the usual 60 cycle line, the arrangement is adapted for only a somewhat slower operation, in that the inception of a signal may occur during a negative half cycle of the voltage on the anode 40, and the tube 34 will not fire until the succeeding, positive half cycle arrives. In extremely rapid meteorological recording (as of the type explained hereinabove) this delay (which may be as much as 1/100 of a second) may result in an unpredictable and inaccurate displacement of the eventual dot or record mark on the chart. For slower operations, however, this casual displacement of the record marks becomes relatively inconsequential. Another disadvantage of the arrangement of Fig. 3 is that it requires an alternating current supply, whereas a system of the type of Fig. 2 may be operated from any source, such as suitable batteries (connected in lieu of the power supply and heater transformer shown). Operation of the circuit of Fig. 3 will be somewhat improved, as to speed of response, if a relatively high-frequency alternating current source (say 200 to 400 cycles) is available for anode supply, for example as may be obtained with portable engine generator apparatus of the character described and claimed in the pending Wallace application Serial No. 317,635, filed February 7, 1940.

Figure 4:
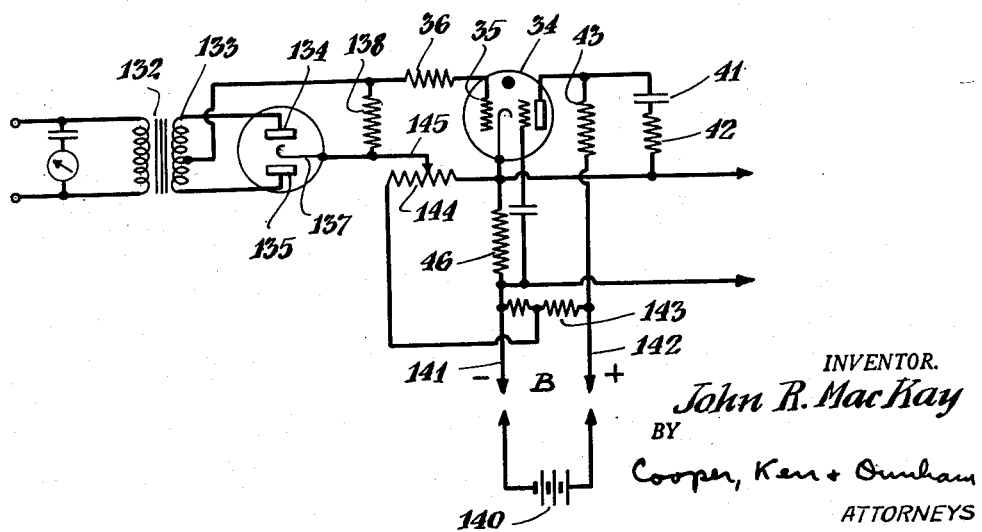
Fig. 4 is a fragmentary wiring diagram of a further modification, more particularly related to the input circuit.

Fig. 4 shows a somewhat modified form of input circuit for relay apparatus of the sort hereinabove described, and although Fig. 4 is conveniently shown as embodying the preferred discharge-interrupting arrangement of Fig. 2, it will be understood that substantially the same modification may be effected in other embodiments, for example that of Fig. 3. The arrangement of Fig. 4 is particularly designed for systems wherein, for example, the remote transmitter sends out separate carrier impulses (rather than impulses consisting of interruptions in the carrier) and reception is with super-regenerative apparatus. In such apparatus, as explained hereinabove, the effect of a received carrier is to suppress the audio frequency rush current in the receiver output, so that if the signals originate as discrete carrier impulses, they are converted into interruptions in the output rush.

In Fig. 4, the output of the receiver is connected to an audio frequency transformer 132 preferably having a center-tapped secondary. The outer terminals of the secondary 133 are connected to the respective plates 134, 135 of a full wave rectifier tube, which may be of any type suitably sensitive to the received signals, for example a tube of the indirectly heated type such as RCA 84. To complete the rectifying system the center-tapped secondary 133 and the cathode 137 of the rectifier 136 are connected for passage of rectified current through a suitable resistor 138. As shown, the resulting, substantially continuous voltage drop across the resistor 138 tends to apply a negative bias (through the current-blocking resistor 36) to the control grid 35 of the gas tetrode 34. The "B" or anode voltage supply, generally designated by the battery 140 and applied at the terminals 141, 142, is shunted with a voltage-dividing resistor 143, from which a suitable tap extends to one end of a potentiometer 144, the other side of the potentiometer resistance being returned to the negative of the voltage source by way of the dropping resistor 46. It will be noted that the voltage thus developed across the potentiometer 144, and applied (in accordance with adjustment of the contact 145) in the grid circuit of the tube 34, is positive with respect to the grid 35 and thus opposes the voltage drop produced by the rectifier across the resistance 138.

Assuming that a super-regenerative receiver is connected to the transformer 132, and no signal is received, the rectified rush current produces the described voltage drop across resistor 138, and the potentiometer contact 145 is so adjusted as not to overcome the resulting negative bias, i. e. the bias is maintained sufficiently negative for cut-off and the tube does not fire. However, if a signal (unmodulated carrier) is received, the rush current is suppressed, and the negative voltage developed across the resistor 138 disappears or is materially reduced. As a result, the tube fires, and the combination of condenser 41, current limiting resistor 42 and voltage dropping resistor 43 in the output of the tube, operates exactly as hereinbefore described with respect to Fig. 2, producing a voltage drop across the resistor 46, for example for control of the time delay and subsequent circuits (not shown in Fig. 4) as hereinabove set forth. Upon termination of the signal impulse, the rush current re-establishes the cut-off negative bias on the grid 35, and the self-interrupting anode circuit causes the tube to become inoperative. As explained, the remainder of the circuit may be substantially identical with that in preceding figures although preferably, if an arrangement of the sort shown in Fig. 2 is used, a separate, small biasing battery should be included (as in Fig. 3) in the grid circuit of the second grid glow tube to provide the requisite negative cut-off voltage, inasmuch as the same would not be derived from the resistor 46 in the circuit of Fig. 4. The sensitivity of the arrangement shown in Fig. 4 may be varied and set, by adjusting the potentiometer arm 145.

The relay structure and procedure may thus be adapted for response to a variety of different types of signalling. In addition to the several signal characteristics mentioned, it will be noted that where the remote transmitter sends a continuously modulated carrier, and the signal impulses consist of removal of modulation from the carrier, the circuit of Fig. 4 may also be advantageously used with any type of receiver, e. g. of the superheterodyne or tuned radio frequency as well as the super-regenerative type. As explained, if a continuous unmodulated carrier is transmitted and the signals or impulses constitute interruptions in the carrier, the system of Fig. 2 may be used for super-regenerative receivers, or the system of Fig. 4 with other types of receivers (providing a beat oscillator or its equivalent is employed to convert the detected carrier into an audio frequency note). When the carrier is continuous and the signals consist of temporary modulation of the carrier at an audio frequency, the system of Fig. 2 may be used (with any kind of receiver), and where the transmission is discontinuous and consists of discrete modulated signals picked up with a receiver of other than the super-regenerative type, the input arrangement of Fig. 2 is likewise advantageous.

It will now be appreciated that the invention provides an extremely accurate, sensitive and reliable relay arrangement and likewise a reliable and uniform time delay system, wherein the amount of delay may be accurately adjusted as desired, and wherein the delay may be, so to speak, unidirectional. It will be noted, referring for example to Fig. 2, that the current through resistor 46, resulting from operation of the tube 34, is always the same and is entirely independent of variations in signal strength. Consequently, the resulting voltage drop is similarly uniform, so that when set as desired by the resistor 56, the time delay is always the same for the application of the voltage to control the second tube 55. By the same token, the output current of the second tube, e. g. through the relay winding 65, is likewise constant and uniform, thus guaranteeing proper action of the relay or other controlled apparatus, at all times.

The procedure and apparatus described may be applied to many other uses, as for response to other types of radio signalling or other electrical controls, and the various elemental features and sub-combinations may similarly be utilized for other purposes, to great advantage wherever sensitive and accurate relay means are desired.

It is to be understood that the invention is not limited to the embodiments herein shown and described but may be carried out in other ways without departure from its spirit as defined by the following claims.

I claim:

1. In radio apparatus comprising a radio receiver adapted to receive significantly timed impulses from a remote transmitter, and a recording device responsive to timed impulses, the combination of an ionic discharge tube having a control electrode, means connecting said electrode to the receiver for discharge of the tube in response to said impulses, means responsive to discharge of the tube for establishing a predetermined unidirectional control voltage for the duration of each impulse, relay apparatus for effecting operation of the recording device in response to said control voltage, and unidirectional time delay means intermediate said voltage establishing means and said relay apparatus and comprising a condenser connected to said relay apparatus and connecting means intermediate said condenser and said voltage establishing means, having a high resistance to current in one direction and a low resistance to current in the opposite direction.

2. In combination with radio receiving apparatus, a normally nonconductive electronic device including a control electrode and having means for establishing a conductive path in response to predetermined minimum electrical condition of said control electrode and for thereafter maintaining said path so long as not less than a predetermined voltage is applied to said means, said means being adapted to maintain the conductivity of said path at a predetermined value regardless of change in electrical effect at the control electrode so long as the control electrode is maintained in at least said minimum electrical condition, a circuit connecting said electrode for control by the receiving apparatus and having means for normally preventing establishment of said electrical condition but adapted to establish same in response to a signal in said circuit, output means associated with said first-mentioned means and comprising a condenser dischargeable through the first-mentioned means, means for charging the condenser, and impedance means between said charging means and said first-mentioned means, for applying voltage of the aforesaid value to said first-mentioned means and periodically reducing said voltage below said value, to prevent maintenance of the conductive path when the predetermined condition is absent from the control electrode, a time delay circuit comprising condenser means and means impeding flow of charging current thereto, the aforesaid output means including means responsive to current flow in said output means for applying a substantially unidirectional and continuous electromotive force to said time delay circuit for the duration of the signal in the control electrode circuit, and translating means controlled by said time delay circuit in response to charge of said condenser means to a predetermined potential.

3. Relay apparatus comprising, in combination, an electronic device of the gas-containing type having a control electrode and means for rendering the device conductive by electrical discharge therein in response to a predetermined electrical condition at said electrode when the device is subjected to a predetermined discharge voltage, means biased to maintain said discharge voltage on the device and including relaxation means responsive to conductivity of the device for periodically interrupting the discharge thereof, to prevent continuance of discharge when the aforesaid predetermined condition disappears at the control electrode, and associated means responsive to the periodically interrupted discharge of the device, for establishing a predetermined, substantially unidirectional and constant, detectable electrical effect so long as the predetermined condition may be maintained at the control electrode, said associated means comprising impedance means connected to the device to receive periodic current flow in response to the periodically interrupted discharge, for establishing a voltage drop, and filtering means associated with said impedance means.

4. In radio receiving apparatus, the combination, with means for converting a received signal into a substantially continuous electromotive force having a duration corresponding to the signal, of an electrical discharge device having a control electrode and having output means responsive to a potential of at least a predetermined value on said control electrode, for establishing a detectable electrical effect having a value substantially independent of the actual value of the potential on the control electrode, translating means controlled by said last-mentioned means in response to said effect, and means connecting said control electrode for control by the aforesaid electromotive force, including a condenser connected to said control electrode and adapted for charge by said electromotive force, and means impeding flow of current to said condenser, to delay charging of same to the aforesaid predetermined potential, said first-mentioned means comprising an electronic device of the gas-containing type controlled by the received signal and having self-interrupting output means for establishing and maintaining said electromotive force in response to a received signal of predetermined value and regardless of change in the strength of said signal above said value.

5. In combination, radio receiving apparatus, a grid glow tube having an anode and a circuit therefor and controlled by said apparatus to fire and produce current flow in said anode circuit in response to received signals, translating means, and means connecting said translating means for control by said tube, comprising means in said anode circuit and responsive to firing of the tube, for setting up a predetermined unidirectional electromotive force, a condenser adapted to receive charge from said electromotive force, and means impeding flow of current to said condenser, for delaying response of the translating means to a received signal until the condenser has received a predetermined charge.

6. Relay apparatus comprising, in combination, an electronic device of the gas-containing type having a control electrode and means establishing a conductive discharge when the control electrode is raised to a predetermined potential, means connected to said last mentioned means and responsive to discharge of the device, for establishing a predetermined unidirectional control voltage of uniform value independent of voltage variations upon said control electrode above said predetermined potential, condenser means and means including a resistance for connecting said condenser means to receive charge from said predetermined voltage, whereby charge of said condenser means is delayed by the resistance, means including a second electronic device of the gas-containing type having a control electrode connected to said condenser means, for establishing a control current in response to a predetermined charge of said condenser means, and a unidirectionally conductive device connected across said resistance for rapid discharge of the condenser means upon interruption of the aforesaid predetermined voltage.

7. Relay apparatus comprising, in combination, a pair of grid-controlled gas discharge tubes connected in cascade relation, and unidirectional time delay means intermediate said tubes, comprising series-connected condenser and resistance means and a rectifier connected across the resistance means, each of said tubes including associated circuit means of predetermined electrical constants for poising the tube to discharge and for establishing relaxation oscillations in the associated tube and at a frequency determined by said constants, to render the discharge of the tube self-interrupting.

8. In the translation of radio signals, the method of providing a constant delay in response, regardless of substantial variation in amplitude of the signals, comprising converting each signal into a control potential, converting the control potential into an ionic discharge having a current value independent of the signal amplitude, converting the discharge into unidirectional electromotive force of correspondingly independent value, applying said electromotive force to a condenser to charge the same while impeding the flow of charging current to a predetermined extent, translating the condenser charge when it reaches a predetermined potential, and converting interruption of the signal into immediate interruption of the aforesaid electromotive force, for interruption of the condenser charge.

9. The method of claim 11, wherein the translating step includes converting the last mentioned predetermined potential of the condenser charge, into a second ionic discharge having a current value independent of any amount by which the condenser charge may exceed said predetermined potential, and converting the current of said discharge into operation of a translating instrument.

10. The method of claim 11, which includes converting interruption of the aforesaid electromotive force into discharge of the condenser substantially instantaneously through a unidirectionally conductive path, to facilitate immediate repetition of all the aforesaid steps in response to an immediately succeeding signal.

11. In relay apparatus, in combination, an electrical discharge device having an anode, a cathode and a control electrode, an input circuit associated with said control electrode, said device being adapted to discharge and become conductive between said anode and cathode in response to a predetermined electrical condition in said input circuit when at least a predetermined voltage is applied to the anode, a condenser connected between said anode and cathode, an anode circuit including an impedance and adapted to include a source of voltage, for charging said condenser to said predetermined voltage, said impedance being adapted, in response to discharge of said device, to reduce the effective voltage applied to the anode from the source, for periodically interrupting discharge of the device to prevent maintenance of said discharge when the aforesaid electrical condition is absent from the input circuit, and translating means controlled by flow of current in said anode circuit, said anode circuit extending to the cathode whereby there is current flow in said circuit from said voltage source during times of conductivity of the discharge device, as well as current flow during times of charging said condenser.

12. In relay apparatus, in combination, a thyratron having an anode, control electrode and hot cathode, a voltage-responsive input circuit for said control electrode, normally biased to cut-off, energy supply means for said anode, comprising relaxation oscillator means including a condenser poised to discharge between said anode and cathode and a voltage supply circuit for charging said condenser, for alternately firing and de-activating said thyratron upon and during an elevation of the input circuit above cut-off voltage, and means responsive to operation of said relaxation oscillator means, for establishing a substantially uniform voltage adapted for control of a translating device, said voltage supply circuit being connected to establish current flow therein on each firing of said thyratron, and said last mentioned means being connected to said supply circuit for voltage establishment in response both to charging of said condenser and to said current flow on firing, and including filter means for smoothing the established voltage.

13. In relay apparatus, in combination, an electrical discharge device having an anode, a cathode and a control electrode, condenser means connected between said anode and cathode, means for connecting a source of voltage between said anode and cathode, to charge the condenser means sufficiently for discharge of the device under control of the control electrode, said connecting means including means impeding current flow from said voltage source upon discharge of the device, for thereby reducing the effective voltage on the anode below that sufficient for discharge, impedance means in circuit with said anode to establish an output voltage impulse in response to discharge of said device, and condenser means across said impedance means, for smoothing succeeding voltage impulses into a substantially continuous voltage.

14. A method of translating electrical signals, comprising applying charging voltage to a condenser connected to the anode of a grid-controlled ionic discharge device, applying the signal to the grid of said device to initiate firing thereof by discharge of the condenser, while causing the aforesaid charging voltage to pass additional current through the device, impeding said additional current, and thereby reducing the voltage on the anode to interrupt firing of the device, thereafter repeatedly re-charging the condenser, discharging the same, passing additional current and interrupting firing, for the duration of the signal, converting the successive flows of the said additional current and of the current of re-charging the condenser into a substantially constant voltage, applying said constant voltage to charge another condenser while impeding the flow of charging current thereto for delayed response, applying charging voltage to a third condenser connected to the anode of a second grid-controlled ionic discharge device, applying the voltage of delayed charge of the second condenser to the grid of said second device to initiate firing thereof by discharge of the third condenser, performing and repeating with said second device the same additional-current passing, firing interruption, condenser recharging and discharging operations as aforesaid for the first device, so long as charge is maintained on the second condenser, converting the additional current and condenser recharging current of said second device into a predetermined detectable effect, and upon interruption of the signal, rapidly discharging said second condenser through a unidirectionally conductive path to prevent delay in the interruption of operation of the said second device.

15. In combination, radio receiving apparatus, a grid glow tube, translating means operated thereby, and means connecting said tube for control by the receiving apparatus and including means for reducing the interference of stray electrical effects with desired signals of appreciable duration, said means comprising a condenser and means impeding flow of current thereto, for delaying response of the tube to a received signal until the condenser has received a predetermined charge, said grid glow tube having a voltage-controlled grid connected for control by said condenser, and intermittent energizing means adapted to effect interruption of operation of said tube in electrical response to diminution of the charge on said condenser below said predetermined charge, said first-mentioned means comprising another grid glow tube connected for control by the receiving apparatus and having an output discharge circuit including relaxation oscillator means for self-interruption of discharge in said output circuit upon interruption of a signal, said output circuit including means establishing a substantially unidirectional and uniform source of charging current for the aforesaid condenser during discharge of the said other grid glow tube.

16. In relay apparatus, in combination, a unidirectional time delay circuit comprising a condenser and means connected in series therewith and having a high resistance to current flow in one direction and a low resistance to current flow in the opposite direction, said means comprising an electron-discharge rectifying device and a variable resistance connected across said device, for adjustment of the time of delay.

17. In relay apparatus, in combination, a time delay circuit comprising resistance means and condenser means, and a unidirectionally conductive device connected across said resistance means, to reduce the delay in one direction, said resistance means comprising a variable resistance, for adjustment of the time of delay.

18. In relay apparatus, in combination, a time delay circuit comprising a condenser and a resistor in series with said condenser for electrical input thereto, and an electronic rectifier having an anode and connected across said resistor, the anode of the rectifier being connected to the condenser-connected side of the resistor.

19. In relay apparatus for effecting operation of a translating device in response to absence of a periodic electromotive force in a signalling circuit, in combination, an electrical discharge device having a control electrode and having output means adapted to control the translating device upon discharge of the device in response to a potential of not less than a predetermined value on the control electrode, and means including rectifying means adapted to be connected to the signalling circuit for converting the periodic electromotive force into a substantially continuous voltage, to maintain the control grid at less than the predetermined value only so long as the periodic electromotive force is present in the signalling circuit.

20. In relay apparatus for effecting operation of a translating device in response to absence of a periodic electromotive force in a signalling circuit, in combination, an electronic device having a control electrode and having output means adapted to effect operation of a translating device in response to a potential of at least a predetermined value on said control electrode, means including a rectifier and adapted to be connected to the signalling circuit, for converting the periodic electromotive force into a control voltage, biasing means establishing a voltage sufficient to raise the control electrode above the aforesaid predetermined operating potential, and means connecting said voltage establishing means and said biasing means in opposed relation and to said control electrode, for maintaining the potential on said control electrode below the predetermined operating value so long as the periodic current is exhibited by the signalling circuit.

21. Relay apparatus comprising electronic relay means for converting an electrical signal into a predetermined electromotive force independent of variations of signal strength, electrically actuated translating means to be controlled by said relay means and in response to a predetermined electrical effect, and electrical transfer means responsive to said electromotive force for electrically impeding the application of a corresponding predetermined electrical effect to the translating means, to delay response of the translating means to the relay means, said transfer means including means electrically responsive to interruption of said electromotive force for substantially immediately interrupting application of said electrical effect, upon termination of the electrical signal, and said transfer means comprising condenser means to be charged from the electromotive force, and a variable resistance intermediate the condenser means and the relay means, for adjustment of the time of delay, and said means which is responsive to interruption of electromotive force comprising rectifying means shunting said variable resistance and conductive in a direction opposite to flow of condenser charging current from the relay means, for rapid discharge of said condenser means.

22. Radio receiving apparatus comprising means for receiving radio signals, and relay apparatus as described in claim 8, connected for control by the receiving means in response to received signals, each of the electronic devices of the relay apparatus having associated circuit means, including normally charged means poising the associated device to discharge, for establishing relaxation oscillations in the associated device and for thereby rendering the discharge of the device self-interrupting.

23. In combination, radio receiving apparatus, a grid glow tube controlled by said apparatus to discharge in response to received signals and having output means for establishing a predetermined unidirectional control voltage upon discharge of the tube, a time-delay signal-transfer circuit comprising condenser and resistance means controlled by said output means in response to said control voltage, a second grid glow tube controlled by said delay circuit to discharge in response to transferred signals and having output means adapted for control of a signal translating device, and circuit means associated with each of said tubes and including normally charged means poised to effect immediate discharge of the associated tube in response to a signal, for establishing relaxation oscillations in the associated tube during discharge thereof and for thereby rendering the discharge self-interrupting.

JOHN R. MacKAY.

CERTIFICATE OF CORRECTION.

Patent No. 2,354,086.　　　　　　　　　　　　July 18, 1944.

JOHN R. MacKAY.

It is hereby certified that error appears in the printed specification of the above numbered patent requiring correction as follows: Page 4, first column, line 50, for "odder" read --order--; page 8, second column, lines 21 and 29, claims 9 and 10 respectively, for the claim reference numeral "11" read --8--; and that the said Letters Patent should be read with this correction therein that the same may conform to the record of the case in the Patent Office.

Signed and sealed this 14th day of November, A. D. 1944.

Leslie Frazer (Seal)　　　　　　　　　　　Acting Commissioner of Patents.

CERTIFICATE OF CORRECTION.

Patent No. 2,354,086.  July 18, 1944.

JOHN R. MacKAY.

It is hereby certified that error appears in the printed specification of the above numbered patent requiring correction as follows: Page 4, first column, line 50, for "odder" read --order--; page 8, second column, lines 21 and 29, claims 9 and 10 respectively, for the claim reference numeral "11" read --8--; and that the said Letters Patent should be read with this correction therein that the same may conform to the record of the case in the Patent Office.

Signed and sealed this 14th day of November, A. D. 1944.

Leslie Frazer (Seal)   Acting Commissioner of Patents.